(No Model.) 2 Sheets—Sheet 2.
A. G. SMITH.
SWAGING MACHINE.
No. 335,320. Patented Feb. 2, 1886.
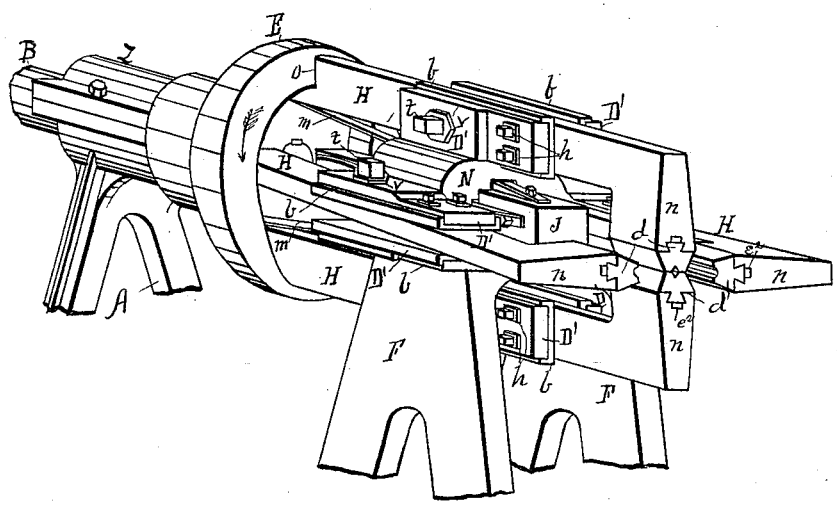
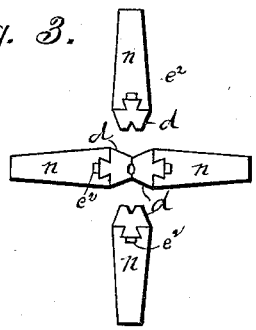
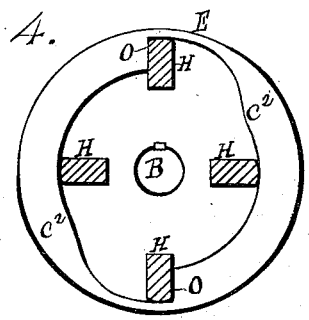
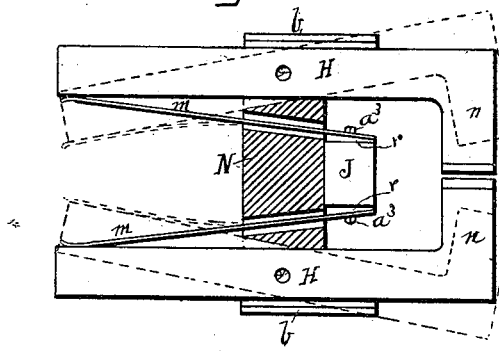
WITNESSES:
C. A. Preston
C. W. Russell
INVENTOR:
Alexander G. Smith
Per
Roscoe B. Wheeler
atty

# UNITED STATES PATENT OFFICE.

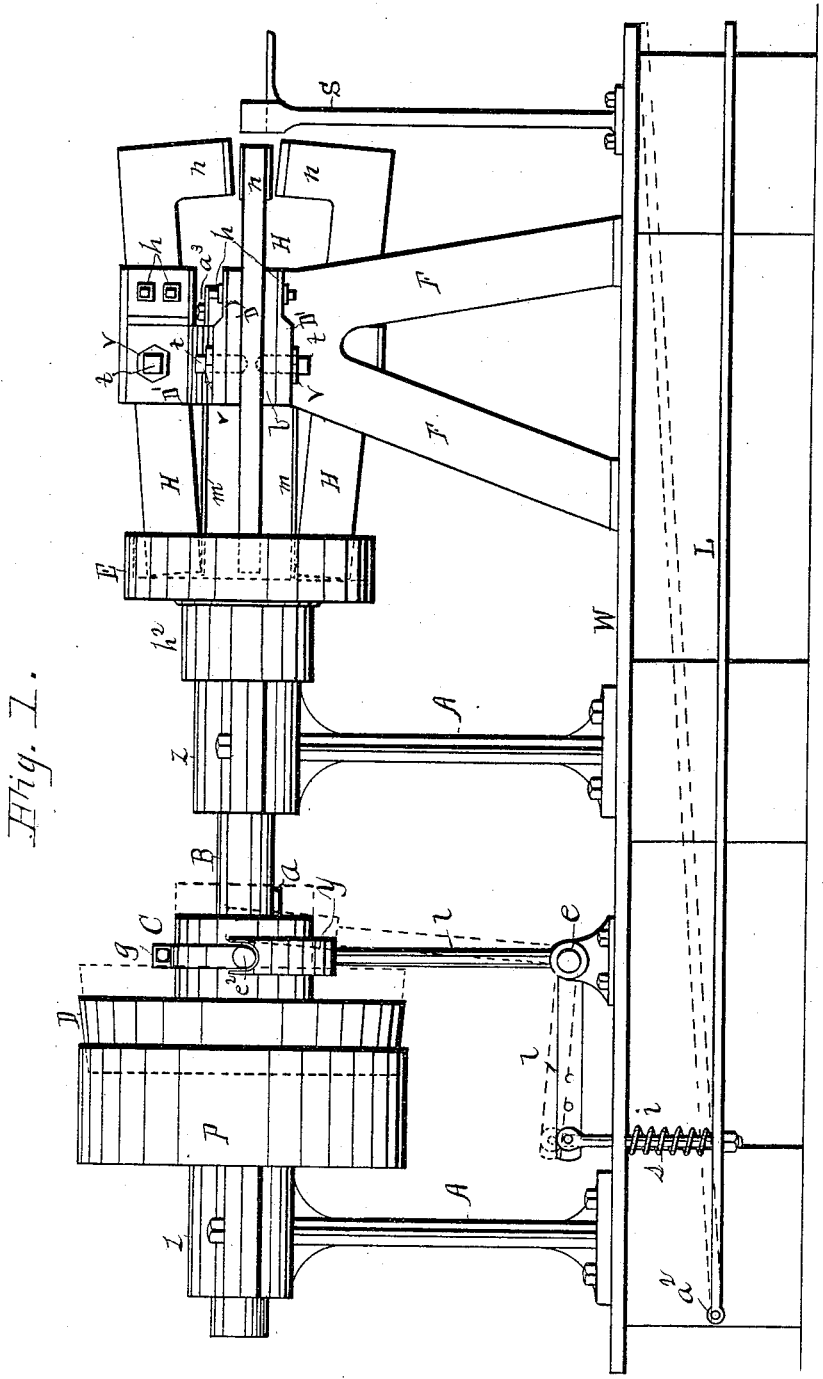

ALEXANDER G. SMITH, OF JACKSON, MICHIGAN, ASSIGNOR TO WITHINGTON, COOLEY & CO., OF SAME PLACE.

SWAGING-MACHINE.

SPECIFICATION forming part of Letters Patent No. 335,320, dated February 2, 1886.

Application filed August 13, 1885. Serial No. 174,264. (No model.)

*To all whom it may concern:*

Be it known that I, ALEXANDER G. SMITH, a citizen of the United States, residing at Jackson, in the county of Jackson and State of Michigan, have invented certain new and useful Improvements in Swaging-Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My present invention in swaging-machines is designed for the purpose of swaging or forming pointed articles—such as the tines of forks, the teeth of rakes, and tangs of files, chisels, and the like; and my invention consists in the grouping together in pairs a series of hammers working together in pairs alternately, as hereinafter set forth, and pointed out in the claims.

In the drawings forming a part of this specification, Figure 1 is a side elevation of my invention. Fig. 2 is an isometrical view of the front end portion, having the rear broken away. Figs. 3, 4, and 5 are details.

A A are the upright hangers, which support the drive-shaft B in bearings Z Z.

P is a heavy drive-pulley which runs loosely on the drive-shaft. Over said pulley the drive-belt passes. The side of the pulley is open and adapted to receive the tapering or sloping faced friction-clutch D, as shown by dotted lines of Fig. 1.

The friction-pulley has a sleeve or hub extension, C. Said hub has an annular recess in its periphery, in which is fitted loosely the collar $g$. Said collar is pivoted on opposite sides at $c^2$ to the yoke Y. Said yoke is attached to the elbow-shaped lever $l$. Said lever is journaled in the support $c$.

To the horizontal portion of the lever $l$, I attach the depending rod $i$. Said rod is attached to the lever L, which extends forward of the machine, as shown in Fig. 1, so as to be depressed by the foot of the operator. The rear end of said lever is pivoted at $a^2$. A spring, $s$, is attached to the lever, for the purpose of raising the lever to the dotted position of Fig. 1, thereby shifting the friction-wheel D to the dotted position of Fig 1, when the hammers will stop striking. The sleeve C of the friction-wheel has an internal longitudinal recess or key-seat, which fits freely over the key $a$. Said key is secured to the shaft B rigidly, thereby turning the friction-wheel and allowing said wheel to slide longitudinally on the shaft. I attach firmly to the front end of the shaft B a cam-wheel, E. Said wheel is provided with a projecting hub, $h^2$.

F F are supports upon which the four-way supporting-head N is mounted. Between the arms D′ of said head I locate the arms H of the hammers $n$. Said hammer-arms are journaled upon the conical-pointed set-screws $t$. Said screws are of steel, and are held in position by a jam-nut, $v$.

Between the arms D′ and H, I locate adjustably brass bearing-plates $b$, which are forced against or from the hammer-arms by means of the set-screws $h$, (see Figs. 1 and 2,) whereby the hammers may be kept in line with each other. I employ four hammers—two working horizontally and two vertically to and from each other—all striking around a common center. The rear ends of the hammer-arms H are housed within the cam-wheel F, as shown in Figs. 1, 2, and 4. The cam-wheel has on opposite sides an offset, O. (See Figs. 2 and 4.)

Attached to the head J are four strong springs, $m$, which extend along the arms of the hammers, their outer ends pressing outward upon the rear portions of the hammer-arms housed within the cam-wheel E. Said springs are attached to the head J over wedges or inclines $r$. By changing the position of the wedges the tension or pressure of the springs $m$ upon the hammer-arms H may be regulated. The dies $d$ are dovetailed to the heads of the hammers and held by wedges $e^2$, as shown in Figs. 2 and 3, or they may be held by set-screws. The face or joining parts of the dies are provided with a channel or form desired to give the material swaged its proper shape. The wedges $e^2$ are loosened, when the dies may be moved longitudinally within the dovetail channels of the hammer.

The operations of the machine are as follows: The material to be swaged or pointed is placed upon the support S. The lever L is forced down from the dotted position of Fig. 1 to its normal position, whereby the friction-pulley D is brought in contact with the drive-pulley, thus giving motion to the cam-wheel E, which turns in the direction indicated by the arrow of Fig. 2. It will be observed that as the wheel E revolves, the arms of the hammers, by the pressure of the springs $m$, are forced against the cams $C^2$, and as said cams are provided with two offsets, O, on opposite sides, (see Fig. 4,) said offsets are brought simultaneously over the hammer-arms, when the springs $m$ of said hammer-arms will cause the rear ends of said arms to rapidly separate, thereby bringing rapidly together or toward each other two hammers, as shown in the position of the vertical hammers of Figs. 2 and 5. It will also be observed that at the same time the two opposite or horizontally-swinging hammers are separated or drawn from the material being struck by the forcing inward of the housed ends of said hammer-arms by the pressure of the cams $C^2$, as shown in Figs. 2 and 4; that as the cam-wheel continues in its course the hammers in pairs are alternately brought together and separated, thereby bringing a rapid sucession of blows upon the material to be formed, and to produce a long taper the material may be moved longitudinally between the blows of the hammers. This machine as constructed is durable, works easy, and with great rapidity.

Having thus fully set forth my present invention, what I claim as new, and desire to secure by Letters Patent, is—

1. In a swaging-machine, the combination of the horizontal drive-shaft, the loose drive-pulley, the friction-clutch, the mechanism for operating said clutch, the cam-wheel, the series of hammers, the arms of which work on pivot-bearings, said arms engaging with the cam, the springs for operating said hammers adjustably attached to the head, their free ends pressing the rear ends of the hammer-arms, as set forth.

2. The combination of the horizontal shaft, the cam-wheel, the pair of hammers swinging vertically, the pair of hammers swinging horizontally, the arms of which work on adjustable bearings within the four-way support D', engaging with the cam $C^2$, the springs attached to the head J, and wedges for adjusting said springs, substantially as specified.

3. In a swaging-machine substantially as set forth, the combination of the supports F, the head N, mounted thereon, said head having the four-way supports D', the hammer-arms journaled between said supports, the brass adjusting-plates $b$, located between the supports D' and hammer-arms H, the set-screws $h$, working against said brass plates, and the hammers $n$, having adjustable dies $d$, as and for the purposes specified.

In testimony whereof I affix my signature in presence of two witnesses.

ALEXANDER G. SMITH.

Witnesses:
ELI A. CLEMENT,
H. DORR BLAKEMAN.